Feb. 4, 1958 W. W. BENZ ET AL 2,821,971
ARRANGEMENT FOR ATTENUATING SPRING VIBRATIONS
Filed Feb. 3, 1956 2 Sheets-Sheet 1

INVENTOR
Walter W. Benz
and
Herbert Bartholome
By
Patent Agent

INVENTOR
Walter W. Benz
and
Herbert Bartholome
By
Patent Agent

United States Patent Office 2,821,971
Patented Feb. 4, 1958

2,821,971

ARRANGEMENT FOR ATTENUATING SPRING VIBRATIONS

Walter W. Benz, Leverkusen, and Herbert Bartholome, Neu-Ulm, Germany, assignors to Klöckner-Humboldt-Deutz Aktiengesellschaft, Köln, Germany Application February 3, 1956, Serial No. 563,391

Claims priority, application Germany February 9, 1955

9 Claims. (Cl. 123—90)

The present invention relates to an arrangement for dampening or attenuating the vibrations or oscillations of springs, especially of valve springs of high speed internal combustion engines. With such engines sometimes vibrations of the valve springs occur which may result in considerable difficulties. The divided or two-part cone clamps by means of which the valve discs are held periodically detach themselves from the valve stem and cause wear. In these circumstances, the valve stem breaks at the said worn portion so that the valve drops into the working cylinder and causes a destruction of the driving elements.

In an effort to remedy the situation, an arrangement has been provided heretofore according to which tongue-like members have been connected to the cylinder head which members slide on the outside of the spring windings. Such an arrangement, however, causes an unnecessary friction which is effective during the entire stroke of the spring during the opening and closing of the valve.

It is, therefore, an object of the present invention to provide an arrangement for dampening or attenuating spring vibrations, which will overcome the above mentioned drawbacks.

It is another object of this invention to provide an arrangement for dampening or attenuating spring vibrations which will be effective over a portion only of the total stroke of the springs to thereby avoid unnecessary friction.

It is still another object of this invention to provide an arrangement of the above mentioned type which is rather simple and does not require any fixed connection to the cylinder head.

These and other objects and advantages of the invention will appear more clearly from the following specification in connection with the accompanying drawings, in which.

Figure 9:
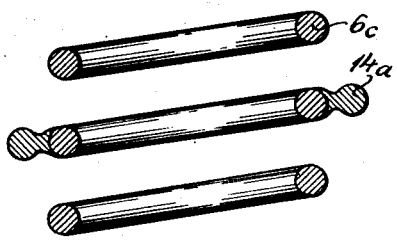
Figure 8:
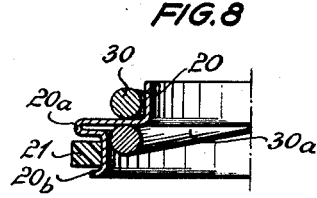

Figs. 8 and 9 respectively illustrate further modifications of the dampening arrangement according to the invention.

General arrangement

Sympathetic vibrations of springs are in conformity with the present invention dampened or attenuated by one or more masses or elements movable in the direction of the spring vibrations, said masses or elements being in frictional connection or in dampened elastic connection with the spring whose vibrations are to be dampened. It is most effective to arrange the said masses or elements, which may be called dampening masses or dampening elements, at about half the length of the spring where the amplitudes are greatest. According to the present invention, the movable dampening masses or elements, the resilient coupling and the dampening are so tuned with regard to each other that the dampening arrangement works primarily in response to the occurrence of spring vibrations and suppresses the same. The dampening mass or element may be freely movable with regard to the spring or may by elastic means be returned to its central position relative to the spring to be dampened. The spring and the mass or masses or dampening elements may by elastic elements be returned into a central position relative to the spring to be dampened. The spring and mass may be made of an elastic dampening material as for instance rubber. Rubber comprises the three properties: the property of the mass, the elastic return, and the dampening.

According to one embodiment of the invention, the guiding means for the dampening masses or elements are clamped between the ends of a two-part spring. The guiding means will then automatically take part in the spring vibrations. The dampening mass is, in this instance preferably annular, and the guiding means consists of an annular casing, while the dampening friction is produced by a liquid or by air.

A particularly simple materialization of the invention is obtained by means of a unilaterally slit bushing which is arranged inside or outside of the spring and is pressed against the windings of the spring, preferably by elastic tension of the bushing itself. For this purpose bushings of wear-resistant synthetic material have proved most effective. The natural spring of the bushing may also be aided by an additional unilaterally open annular spring. Expediently, the bushing is of such a length that it approximately equals the distance between the spring disc and the cylinder head when the valve is open, in other words nearly equals the length of the spring in its maximum compressed condition. In this way the central position of the spring is automatically corrected by abutting against the cylinder head or valve disc. In this instance no separate returning elements are required.

Structural arrangement

Figure 1:
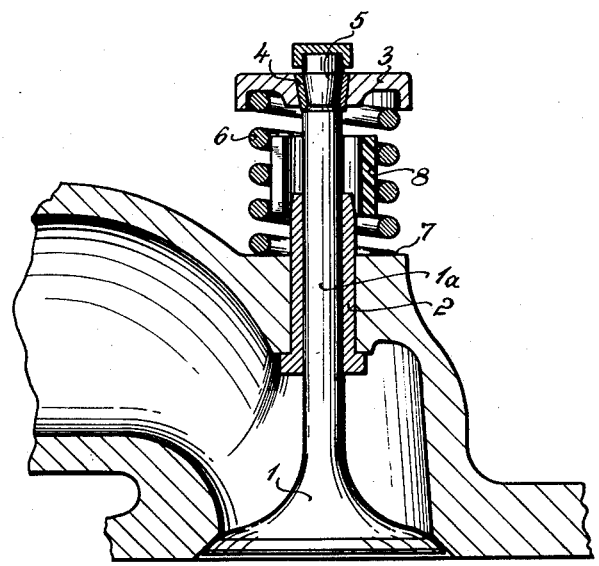
Fig. 1 illustrates a section through a dampening arrangement according to the invention in connection with a valve for an internal combustion engine.

Referring now to the drawings in detail and Fig. 1 thereof in particular, the arrangement shown therein comprises a valve 1 the stem 1a of which is in a manner known per se guided in an exchangeably arranged bushing 2. The spring disc 3 is held in a manner known per se on a cone-shaped seat 5 of the valve stem by means of a cone-shaped sleeve 4 which is divided in longitudinal direction thereof. The arrangement furthermore comprises a coil spring 6 one end of which rests against a surface 7 of the cylinder head, while the other end of spring 6 rests against the lower surface of the spring disc 3. In this way the spring continuously urges the valve into its closing position. The valve is opened in customary manner by control cams (not shown) which act upon the valve by push rods or rocker arms or the like. Within the valve spring 6 there is arranged the bushing 8 according to the present invention. This bushing 8 is provided with a unilateral slit 9 and by means of its own tension has its outer circumference resting against the inwardly pointing surfaces of the spring windings. During the opening and closing of the valve which is effected in conformity with the working cycles and therefore at very high speed particularly with high speed engines, spring vibrations occur which are absorbed or attenuated by the bushing 8 according to the invention.

The bushing 8 is freely movable within the height of the spring and preferably consists of a wear-resistant synthetic material for instance nylon.

Similar to the situation prevailing with sealing rings for working pistons, it may be advantageous to give a bushing, when in expanded condition, a curvature varying over the circumference so that after the bushing has been inserted into the spring, it will on all sides and with a uniform force be pressed against the windings of the spring.

Figure 3A:
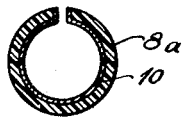
Fig. 3a is a section through Fig. 3 taken along the line IIIa—IIIa thereof.
Figure 2:
Fig. 2 is a cross section through a bushing forming a part of the dampening arrangement according to the invention.
Figure 3:
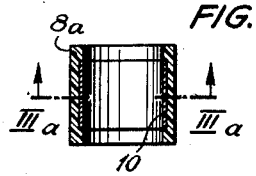
Fig. 3 is a longitudinal section through a modified bushing for the dampening arrangement according to the invention.

The bushing of the invention shown in Figs. 3 and 3a has its interior provided with a uniformly shaped leaf spring 10, for instance of steel or bronze for supporting the outwardly directed springiness. The leaf spring is inserted into an annular groove of the bushing so that a relative longitudinal displacement between leaf spring and bushing will be impossible. The free ends of the annular leaf spring are bent off toward the outside as is clearly shown in Fig. 3a and engage the slit of the bushing to thereby prevent a relative rotative displacement between the bushing and the leaf spring.

With the embodiments shown in Figs. 1 to 3a, it may be expedient to design the outer circumference of the bushing slightly conical so that the central portion only of the bushing slides on the windings of the spring.

Figure 4:
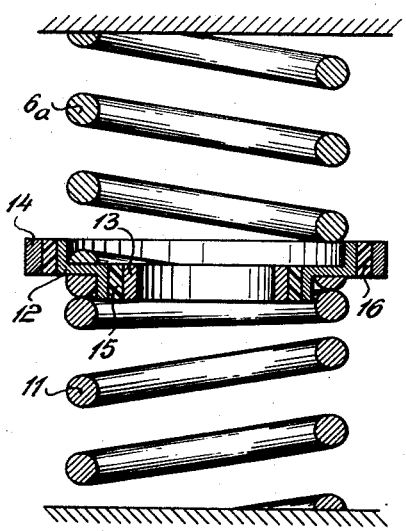
Fig. 4 is a section through a modified dampening arrangement according to the invention.

The arrangement shown in Fig. 4 comprises a valve spring composed of two sections 6 and 11 between which is inserted a ring 12 of a step-like cross section. The inside and outside of ring 12 are respectively provided with an annular attenuating mass 13, 14 while rings 15 and 16 vulcanized to the ring 12 and the masses 13 and 14 are respectively interposed between said masses and the ring 12. The rings 15 and 16 consist of an elastic material having an attenuating characteristic of their own. The attenuating masses 13 and 14 may consist of steel whereas the rings 15 and 16 may consist of "Buna"-Group.

The masses 13, 14 and the elastic rings 15, 16 are expediently tuned to the natural frequency of the spring. The attenuating means according to Fig. 4 may, of course, also be arranged on one side only, i. e. either on the inside only or on the outside only.

Figure 5:
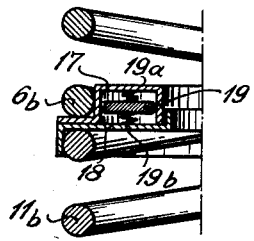
Fig. 5 is a section through still another modification of the dampening arrangement according to the invention.

The embodiment of the invention shown in Fig. 5 comprises an annular guiding casing composed of two parts 17 and 18 and clamped in between the ends of the divided spring 6b, 11b. An annular mass 19 which if desired may be arranged between springs 19a, 19b is mounted within the casing 17, 18. The attenuation in conformity with the present invention is brought about by the resistance of the air which passes through the annular gaps at the inner and outer circumference of the casing from the upper side toward the lower side and vice versa. When dimensioning the annular gaps correspondingly greater, instead of air, also a viscous liquid may be employed.

Figure 6:
Fig. 6 illustrates a slight modification over a part of Fig. 5.

The arrangement of Fig. 6 shows a uniform casing partly filled with a viscous liquid 25 such as a silicon compound. The liquid serves both as mass and by its inner friction as attenuating element.

Figure 7:
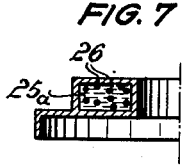
Fig. 7 shows an arrangement similar to Fig. 6 with metal particles in the viscous liquid of the Fig. 6 arrangement.

The arrangement of Fig. 7 is similarly to that of Fig. 6 filled with a viscous liquid 25a. In addition thereto metal particles 26 which are thrown back and forth serve as attenuating or absorbing mass.

The arangement shown in Fig. 8 comprises two half springs 30, 30a and a guiding element 20 clamped between the ends of said half springs 30, 30a. The element 20 serves as guide for an annular mass 21 arranged on the outside of the member 20 between flanges 20a, 20b. The annular mass 21 which is movable in axial direction has a unilateral slit similar to the slit 9 of the bushing 8 of Figs. 1 and 2 and is tensioned toward the inside. If desired, the mass 21 may also be directly connected to the windings of the spring 6c as shown in Fig. 9 rather than being connected to a separate ring 12 as shown in Fig. 4. The additional masses 14a of Fig. 9 would, in such an instance, be helically designed. If desired, the additional masses 13 and 14 may be replaced by rubber.

It is, of course, to be understood that the present invention is, by no means, limited to the particular constructions shown in the drawings but also comprises any modifications within the scope of the appended claims.

What we claim is:

1. In combination with coil spring means arranged to vibrate in axial direction thereof: vibration attenuating means movable in the direction of vibration of said spring means together with the latter and supported by said spring means only, said vibration attenuating means frictionally engaging said coil spring means and being spaced from the outer ends of said spring means in non-compressed condition of the latter.

2. In combination with coil spring means arranged to vibrate in axial direction thereof: vibration attenuating means movable in the direction of vibration of said spring means and arranged in dampened elastic connection with said spring means, the ends of said vibration attenuating means being spaced from the ends of said coil spring means and being movable together with the latter in axial direction thereof.

3. In combination with coil spring means arranged to vibrate in axial direction thereof: vibration attenuating means supported by said spring means at about half of the axial length of said spring means in non-compressed condition, said vibration attenuating means being arranged to move in axial direction of said coil spring means relative to and together with the latter.

4. In combination with coil spring means arranged to vibrate in axial direction thereof: vibration attenuating means supported by said spring means in an elastic manner relative to said spring means, said vibration attenuating means being movable in axial direction of said coil spring means together with and relative to the latter.

5. In combination with a cylinder head of an internal combustion engine having a reciprocable valve member provided with a stem: a spring disc connected to one end of said stem, a coil spring surrounding said stem and interposed between said cylinder head and said disc, and a bushing having a longitudinal slit and frictionally engaging a portion of said spring, the ends of said bushing being spaced from the ends of said coil spring in non-compressed condition of the latter whereby said bushing is axially movable between the ends of said coil spring in non-compressed condition of the latter.

6. In combination with a cylinder head of an internal combustion engine having a reciprocable valve member provided with a stem: a spring disc connected to one end of said stem, a coil spring surrounding said stem in spaced relationship thereto and interposed between said cylinder head and said disc, a bushing provided with a longitudinal slit and arranged inside said coil spring, the ends of said bushing being spaced from the ends of said coil spring in non-compressed condition of the latter whereby said bushing is axially movable between the ends of said coil spring in non-compressed condition of the latter, and an annular spring mounted within said bushing and pressing said bushing into frictional engagement with the inside of said coil spring.

7. In combination with a cylinder head of an internal combustion engine having a reciprocable valve member provided with a stem: a spring disc connected to one end of said stem, a coil spring surrounding said stem and interposed between said cylinder head and said disc, and a bushing arranged at the central longitudinal portion of said coil spring and frictionally engaging the same, the ends of said bushing being spaced from the ends of said coil spring in non-compressed condition of the latter whereby said bushing is axially movable between the ends of said coil spring in non-compressed condition of the latter, said bushing having a length slightly shorter than said coil spring in its compressed condition of operation.

8. In combination with a cylinder head of an internal combustion engine having a reciprocable valve member provided with a stem: a spring disc connected to one end of said stem, a coil spring surrounding said stem in spaced relationship thereto and interposed between said cylinder head and said disc, and a bushing arranged within said coil spring in frictional engagement with a portion thereof, said bushing having its ends spaced from the ends of said coil spring in non-compressed condition of the latter and being axially movable between the ends of said coil spring in non-compressed condition of the latter, said bushing having the tendency continuously to increase its diameter to thereby maintain frictional engagement with the inside of said coil spring.

9. In combination with a cylinder head of an internal combustion engine having a reciprocable valve member provided with a stem: a spring disc connected to one end of said stem, a coil spring surrounding said stem in spaced relationship thereto and interposed between said cylinder head and said disc, a bushing of nylon material arranged within said coil spring in frictional engagement with a portion thereof, said bushing having its ends spaced from the ends of said coil spring in non-compressed condition of the latter and being axially movable between the ends of said coil spring in non-compressed condition of the latter, said bushing having the tendency continuously to increase its diameter to thereby maintain frictional engagement with the inside of said coil spring, and means arranged inside said bushing and continuously urging said bushing to increase its diameter.

References Cited in the file of this patent

UNITED STATES PATENTS

| | | |
|---|---|---|
| 2,178,444 | Ware | Oct. 31, 1939 |
| 2,359,915 | Hussman | Oct. 10, 1944 |
| 2,530,034 | Sjolander | Nov. 14, 1950 |
| 2,559,903 | Sjolander | July 10, 1951 |
| 2,562,595 | Blue | July 31, 1951 |
| 2,650,086 | Sjolander | Aug. 25, 1953 |

FOREIGN PATENTS

| | | |
|---|---|---|
| 268,564 | Germany | Dec. 20, 1913 |
| 266,498 | Italy | July 30, 1929 |